US009472926B2

(12) United States Patent
Sologuren-Sanchez et al.

(10) Patent No.: US 9,472,926 B2
(45) Date of Patent: Oct. 18, 2016

(54) GAS-INSULATED SWITCHGEAR ARRANGEMENT

(71) Applicant: ABB Technology AG, Zurich (CH)

(72) Inventors: Diego Sologuren-Sanchez, Wettingen (CH); Arben Sabani, Zurich (CH); Markus Keller, Zurich (CH); Tilo Bolli, Merlingen (CH)

(73) Assignee: ABB Schweiz AG, Baden (CH)

( * ) Notice: Subject to any disclaimer, the term of this patent is extended or adjusted under 35 U.S.C. 154(b) by 519 days.

(21) Appl. No.: 13/682,290

(22) Filed: Nov. 20, 2012

(65) Prior Publication Data

US 2013/0148268 A1 Jun. 13, 2013

Related U.S. Application Data

(63) Continuation of application No. PCT/EP2010/056982, filed on May 20, 2010.

(51) Int. Cl.
| | |
|---|---|
| *H02B 13/035* | (2006.01) |
| *H02B 5/06* | (2006.01) |
| *H02B 1/22* | (2006.01) |

(52) U.S. Cl.
CPC ............ *H02B 13/0352* (2013.01); *H02B 5/06* (2013.01); *H02B 1/22* (2013.01)

(58) Field of Classification Search
CPC .......... H02B 1/20; H02B 5/06; H02B 13/00; H02B 13/02; H02B 13/035; H02B 13/0352; H02B 7/01; H01H 33/70; H02H 33/66
USPC ........ 361/601–603, 610–612, 620–622, 631, 361/641, 642; 307/142, 147, 148, 149; 200/48 A, 48 B; 218/2, 7, 43, 57, 59, 218/75–79, 67, 68, 120, 155, 80, 152, 60
See application file for complete search history.

(56) References Cited

U.S. PATENT DOCUMENTS 3,889,076 A * 6/1975 Olsen et al. ................ 200/48 R
4,644,442 A * 2/1987 Ponsioen et al. ............. 361/612
(Continued)

FOREIGN PATENT DOCUMENTS

| CN | 1197316 A | 10/1998 |
|---|---|---|
| CN | 101507069 A | 8/2009 |

(Continued)

OTHER PUBLICATIONS

International Search Report (PCT/ISA/210) issued on Mar. 3, 2011, by the European Patent Office as the International Searching Authority for International Application No. PCT/EP2010/056982.

*Primary Examiner* — Michail V Datskovskiy
(74) *Attorney, Agent, or Firm* — Taft Stettinius & Hollister LLP (57) ABSTRACT

A gas-insulated switchgear bay includes at least three circuit breakers, which define a longitudinal direction, for interrupting conductor phases at different electrical potentials. The circuit breakers each have a first and second power connection, which define a first and second axis extending orthogonally to the longitudinal direction. A first busbar section is attachable to the first power connection, and the first busbar conductors thereof, each define a third axis, which extends orthogonally to the longitudinal direction and the first axis. A second busbar section is attachable to the second power connection, and the second busbar conductors thereof, each define a fourth axis, which extends orthogonally to the longitudinal direction and the first axis. A first distance between the first and second axes is such that the fourth axis is arranged with respect to position and orientation on a common straight line with the third axis in the second mounting state.

45 Claims, 5 Drawing Sheets

(56) References Cited

U.S. PATENT DOCUMENTS

| | | | |
|---|---|---|---|
| 4,745,522 A * | 5/1988 | Mitomo et al. | 361/612 |
| 5,578,804 A * | 11/1996 | Berger | H02B 13/035 218/43 |
| 5,627,723 A * | 5/1997 | Hageli et al. | 361/602 |
| 5,777,842 A | 7/1998 | Tsukushi et al. | |
| 5,991,148 A * | 11/1999 | Heil | H02B 5/06 218/75 |
| 6,134,101 A * | 10/2000 | Bucher | H02B 5/06 361/604 |
| 6,614,648 B2 * | 9/2003 | Yamane et al. | 361/612 |
| 6,614,948 B2 | 9/2003 | Jacobowitz et al. | |
| 6,624,372 B1 * | 9/2003 | Ogawa et al. | 218/71 |
| 6,646,861 B1 * | 11/2003 | Watanabe | H02B 5/06 361/612 |
| 7,236,351 B2 * | 6/2007 | Chavot et al. | 361/604 |
| 7,391,605 B2 * | 6/2008 | Sologuren-Sanchez et al. | 361/612 |
| 7,515,398 B2 * | 4/2009 | Takao | H02B 5/06 218/75 |
| 7,675,738 B2 * | 3/2010 | Fukunaga et al. | 361/612 |
| 7,723,977 B2 * | 5/2010 | Blake et al. | 324/96 |
| 7,903,394 B2 * | 3/2011 | Sadakuni | H02B 1/22 361/612 |
| 2002/0070199 A1 | 6/2002 | Ogawa et al. | |
| 2003/0117769 A1 | 6/2003 | Yamane et al. | |
| 2006/0283841 A1 * | 12/2006 | Sologuren-Sanchez | H02B 5/06 218/79 |
| 2009/0116176 A1 * | 5/2009 | Mori | H02B 1/22 361/612 |
| 2009/0154069 A1 * | 6/2009 | Otsuka | H02B 1/22 361/612 |

FOREIGN PATENT DOCUMENTS

| | | | |
|---|---|---|---|
| DE | 001218591 | * 6/2008 | H02B 1/22 |
| EP | 0 872 931 B1 | 11/2009 | |
| KR | 2003-0055090 A | 7/2003 | |
| WO | WO2008/145324 A2 * | 12/2008 | H02B 5/06 |

* cited by examiner

GAS-INSULATED SWITCHGEAR ARRANGEMENT

RELATED APPLICATION

This application claims priority as a continuation application under 35 U.S.C. §120 to PCT/EP2010/056982 filed as an International Application on May 20, 2010 designating the U.S., the entire content of which is hereby incorporated by reference in its entirety

FIELD

The present disclosure relates to the field of metal-encapsulated gas-insulated switchgear assemblies (GIS), such as gas-insulated high-voltage switchgear assemblies, for example. More particularly, the present disclosure relates to a gas-insulated switchgear bay having at least three conductor phases for different electrical potentials, and to a substation formed from a plurality of such switchgear assemblies.

BACKGROUND INFORMATION

In gas-insulated high-voltage installations, it is known for the functional assemblies such as circuit breakers, grounding switches, etc in a switchgear bay to be of modular design. In this case, the term switchgear bay in general means a bay of a switchgear assembly, and may be designed in various ways, for example, as a switch bay with cable connections, as a switch bay with insulating gas—air bushings, or as a coupling bay for connection of two busbars.

In order to provide a metal-encapsulated, gas-insulated substation, it is known to have at least two bays electrically connected to one another on the input side or output side by means of a so-called busbar in order to transmit primary power.

Since GIS switchgear assemblies are frequently also used in heavily populated regions and/or in other spatially confined regions, not only the performance but also the compactness of a substation is of importance. Particularly in the case of GIS installations and substations for use in very confined conditions, the market demands switchgear assemblies which comply with both requirements.

As a result, a plurality of gas-insulated switchgear assemblies are known which relate to the compactness of the GIS. By way of example, EP0872931B1 and U.S. Pat. No. 6,614,648B2 are cited as representative members of a multiplicity of documents in the patent literature.

SUMMARY

An exemplary embodiment of the present disclosure provides a gas-insulated switchgear bay which includes at least three conductor phases for different electrical potentials, and at least three circuit breakers each respectively provided for a corresponding one of the at least three conductor phases. Each conductor phase is configured to be interrupted by its corresponding circuit breaker. The shapes of the circuit breakers define a longitudinal direction. At least one of the circuit breakers includes a first power connection which defines a first axis which extends orthogonally with respect to the longitudinal direction. The at least one of the circuit breakers includes a second power connection which extends orthogonally with respect to the longitudinal direction in the same direction as the first power connection, the second power connection defining a second axis. The at least one of the circuit breakers is configured to be electrically conductively connected via the first power connection to a respective gas-insulated first busbar conductor of a first busbar section, such that the first busbar conductor defines a third axis which extends orthogonally with respect to the longitudinal direction and orthogonally with respect to the first axis. The first busbar section includes a first busbar housing in which all of the first busbar conductors are arranged in a common gas area. A first distance between the first axis and the second axis is of a size such that a) the switchgear bay has a first busbar section which is electrically connected to the first power connection, in a first mounting state, and b) the switchgear bay has a second busbar section which is electrically connected to the second power connection and has a gas-insulated second busbar conductor, in a second mounting state. The second busbar conductor defines a fourth axis, which is arranged with respect to a position and orientation on a common straight line with the third axis in the second mounting state. The second busbar section includes a second busbar housing in which all of the second busbar conductors are arranged in a common gas area.

BRIEF DESCRIPTION OF THE DRAWINGS

Additional refinements, advantages and features of the present disclosure are described in more detail below with reference to exemplary embodiments illustrated in the drawings, in which.

The reference symbols used in the drawings and their meanings are listed in summary form in the list of reference symbols. In principle, identical or similarly functioning parts are provided with the same reference symbols in the drawings. The described embodiments represent examples of the subject matter of the present disclosure, and have no restrictive effect.

DETAILED DESCRIPTION

Exemplary embodiments of the present disclosure further increase the power density per physical volume of a GIS switchgear bay and of a substation which can be produced using such switchgear bays, in order to make it possible to produce particularly compact substations.

In the case of a GIS busbar, a fundamental distinction is drawn between a first generic type of busbar with single-phase-encapsulated busbar routing, and a second generic type with three-phase-encapsulated busbar routing. Accordingly, with a GIS of the first generic type and of the second generic type, this distinction is highly dependent on their installation layouts. This is evident, for example, from EP0872931B1, which is representative of the first generic type of GIS with single-phase-encapsulated busbar conductors, while U.S. Pat. No. 6,614,648B2 is representative of GIS of the second generic type of GIS.

Exemplary embodiments of the present disclosure are based on improving or enhancing the versatile usage capability of a GIS switchgear bay and therefore power density per physical volume of a GIS switchgear bay by fusion of the first generic type of GIS and the second generic type of GIS to form a new, third generic type of GIS. This third generic type of GIS forms a hybrid of the first and second installation generic types. This hybrid combines as many of the advantages of both generic types as possible and, even with a polyphase/three-phase-encapsulated arrangement of the busbar conductors in the busbar housing, allows a connection topography in the area to a busbar of an adjacent switchgear bay as is known from single-phase-encapsulated busbars.

With regard to the gas-insulated switchgear bay, an exemplary embodiment of the present disclosure provides a switchgear bay which has at least three conductor phases for different electrical potentials, wherein each conductor phase can be interrupted by its own circuit breaker. The shapes of the circuit breakers define a longitudinal direction. At least one of the circuit breakers has a first power connection which defines a first axis which extends orthogonally with respect to the longitudinal direction. This generally applies to all the circuit breakers in the switchgear bay according to the present disclosure. Furthermore, the circuit breaker has a second power connection which extends orthogonally with respect to the longitudinal direction in the same direction as the first power connection and which second power connection defines a second axis. The circuit breaker can be electrically conductively connected via the first power connection to a respective gas-insulated first busbar conductor of a first busbar section, such that the first busbar conductor defines a third axis which extends orthogonally with respect to the longitudinal direction and orthogonally with respect to the first axis. The first busbar section has a first busbar housing in which all of the first busbar conductors are arranged in a common gas area. In other words, all of the first busbar conductors are three-phase-encapsulated in the first busbar housing. In this case, a first distance between the first axis and the second axis is of such a size that: a) the switchgear bay has a first busbar section which is electrically connected to the first power connection, in a first mounting state, and/or
b) the switchgear bay has a second busbar section which is electrically connected to the second power connection and has a gas-insulated second busbar conductor, in a second mounting state, which second busbar conductor defines a fourth axis. In this case, the fourth axis is arranged with respect to position and orientation on a common straight line with the third axis in the second mounting state, and the second busbar section has a second busbar housing in which all of the second busbar conductors are arranged in a common gas area, analogous to the first busbar housing. In this case, the term "gas-insulated switchgear bay" means a switchgear bay for a high-voltage or medium-voltage switchgear assembly.

Although, for the sake of clarity, the discussion generally relates primarily only to a single first busbar conductor or second busbar conductor, this should not be interpreted as meaning that this applies only to a single phase (for example R) but that this also applies in a correspondingly analogous form to the other phases (for example Y and B), which can likewise each be interrupted via a circuit breaker with a first and a second power connection.

Since the first busbar section and the second busbar section each have their own busbar housing, the gas in the respective gas areas of the busbar sections for all the phase conductors of a busbar section can in each case be monitored and protected against overpressure jointly, and can be filled or evacuated jointly via a common filling/emptying connecting stub or the like.

A further advantage results from the longitudinally central arrangement of the second busbar conductor or of the third busbar conductor, seen in the direction of the third axis, between the first and the second power connection of the circuit breaker, such that their third axis and fourth axis are in the same position in space. Since, according to an exemplary embodiment of the present disclosure, this applies in this sense to all phase conductors of the phases (for example R, Y and B) of a switchgear bay, irrespective of whether this has been implemented in the first or the second mounting state, a connection topography to a busbar in an adjacent switchgear bay can be produced, as was otherwise known only from single-phase-encapsulated busbars, for example from EP0872931B1, for the switchgear bay according to the present disclosure with a three-phase-encapsulated arrangement of the busbar conductors in the busbar housing.

The electrical response of the two generic types in the event of a fault caused by an initial fault arc on one phase will be explained briefly first of all in order to assist understanding of an electro-engineering advantage of a hybrid solution such as this including a single-phase and a polyphase module section, in this case, by way of example, the first busbar section and the second busbar section.

In the case of the first generic type with three phase conductors, which are each arranged independently of one another in an isolated form in their own housings—which is referred to as single-phase encapsulation—a fault arc occurs, for example, between a first phase conductor (for example R) and its corresponding, metal-encapsulated housing by the fault arc being formed radially with respect to the housing wall, with respect to the conductor axis. The short (ground short) does not propagate to the other phase conductors (for example Y and B) but remains on the single phase until a protective disconnection takes place, or the housing wall fails. In other words, in the case of a single-phase-encapsulated system, only one phase is affected by the short, while the other two phases can still be used for power transmission, depending on the operating concept.

In the case of the second generic type with three phase conductors, which are arranged together in an isolated form in one housing, which is referred to as three-phase encapsulation, the response to a fault current is different. For optimum space utilization reasons, the three phase conductors, for example, for the phases R, Y and B, may be aligned, seen in the direction of the busbar, as an equilateral triangle whose centroid is arranged on the rotation axis of the generally cylindrical housing. By way of example, after a fault arc has occurred between a first phase conductor (for example R) and the metal-encapsulated housing, the insulating gas in the housing/busbar housing can be heated continuously until it finally becomes sufficiently hot that its isolating effect fails and it becomes conductive. As a result, a flashover occurs between the phases, also referred to as a phase short, with a three-phase arc. In this fault situation, at least at the start of the fault, there is no arc between the conductor and the housing, which is at ground potential.

The third generic type according to the present disclosure is, as has already been mentioned, a hybrid form of the first and second generic types. The technical effect of the hybrid form is that the gas-insulated switchgear assembly, to be precise its busbar section, behaves most of the time like a single-phase-encapsulated GIS of the first generic type in the event of a fault arc, that is to say a fault arc leads to a ground short rather than to a high-energy, three-phase arc, without having to dispense with the advantages of a three-phase-encapsulated GIS. Such advantages include, for example, a common filling and emptying apparatus for the insulating gas, a common overpressure valve (for example a bursting device), common gas-pressure monitoring, common partial-discharge detection and much more, allowing the hybrid solution according to the present disclosure to be designed to be particularly economically.

In accordance with an exemplary embodiment of the gas-insulated switchgear bay, the third axis is arranged at a second distance from the first axis in the longitudinal direction, and the fourth axis is arranged at a third distance from the second axis in the longitudinal direction, wherein the first distance has a length equal to the sum of the second distance and the third distance. In other words, the second distance and the third distance are of the same length, and the first busbar conductor or the second busbar conductor is arranged centrally between the first axis and the second axis.

When a switchgear bay is replaced in a substation, for example, for repair purposes, it is advantageous to be able to electrically conductively connect each first power connection of the circuit breakers to a corresponding gas-insulated first busbar conductor of a first busbar section, such that the third axes of the first busbar conductors lie on a first plane, and such that the first plane extends orthogonally with respect to the longitudinal axis and parallel to the first axis or the first axes. In other words, the center lines (axes) of the busbar sections are arranged on a plane such that the connections of the busbar sections lie on one line in the direction of the third axis, depending on the embodiment.

For example, if the aim is to provide a switchgear bay for a substation with a single busbar arrangement or a double busbar arrangement, then the switchgear bay has a third busbar section which is electrically connected to the first power connection and whose gas-insulated third busbar conductor defines a fifth axis. The fifth axis extends orthogonally with respect to the longitudinal direction and orthogonally with respect to the first axis. Like the first and/or the second busbar section(s), the third busbar section has a third busbar housing in which all of the third busbar conductors are arranged in a common gas area. In the case of a substation, because of the fact that the busbar is connected between the first and the second power connection with respect to the longitudinal direction, particularly compact substations can be achieved. In the case of a switchgear bay of a double busbar arrangement, both the first busbar section and the second busbar section are in consequence electrically connected to the first power connection. In this case, the term "electrically connected" covers not only solutions in which the busbar sections are connected directly to the power connection, but also embodiments in which the busbar sections are connected to the power connection via intermediate pieces or modules.

If the fifth axis has the same orientation co-ordinates as a third axis which has been rotated through 180° about the first axis in some embodiments, then, for example, in the case of a substation having a double busbar arrangement, the second busbar section, which is electrically connected to the second power connection, of a coupling bay and the third busbar section, which is electrically connected to the first power connection, of the double busbar can be produced using physically identical busbar sections, which is financially advantageous.

Depending on the embodiment of the switchgear bay, in particular in the case of switchgear bays for a double busbar arrangement, the third busbar section and the first busbar section are attached to a common connecting module, which forms a conductor node for each conductor phase. This assists both a modular way of connecting the individual modules such as the busbar sections, and also the way in which they are mounted on adjacent installation modules in a GIS.

Following the intrinsic idea of the present disclosure, all the conductor phases in the connecting module are arranged jointly encapsulated in a common gas area. Depending on the requirement, the connecting module has a working grounding switch for each conductor phase.

If the embodiment and the assembly sequence allow, advantageous switchgear bays can be produced with a small number of modules which, however, are multifunctional, by connecting the connecting module as directly as possible to the first power connection of the circuit breaker which is associated with the phase conductor.

In contrast to known switchgear bays, for example a conventional switchgear bay such as that according to EP0872931B1, particularly compact switchgear bays can be produced if, seen in the direction of the third axis, all the conductor nodes are arranged at the same height in the direction of the first axis. This relates in particular to switchgear bays for double busbar circuits. While, in the case of a switchgear bay according to EP0872931B1, the conductor nodes are on the one hand offset in the direction of the busbar and are on the other hand offset in height (in the direction of the first axis), which leads to a step-like design of the switchgear bay and of the busbar for all three phases, the conductor nodes of the connecting module lie on a plane, as a result of which, particularly in the case of cable outgoing bays, i.e. switch bays with cable connections, the switchgear bay according to the present disclosure can be used to produce very compact substations, which are also suitable for use in areas where the physical height is low.

With regard to a particularly modular connecting geometry of the busbar sections and of the connecting module, it is advantageous, in the connecting module, for each conductor node to be connected via a first connecting conductor section which leads to the first busbar conductors. In this case, seen in the direction of the third axis, all the first connecting conductor sections geometrically have a neutral first fiber, which first fibers are all arranged on a second plane, extending in the direction of the longitudinal axis. If the neutral fibers are in a unidirectional form, this can also be referred to as an axis. The connecting geometry can be further improved if, in the connecting module, each conductor node is connected via a third connecting conductor section which leads to the third busbar conductors. In this case, seen in the direction of the third axis, all the third connecting conductor sections geometrically have a neutral third fiber, which third fibers extend in the direction of the longitudinal axis and are all arranged on a third plane. Depending on the embodiment, switchgear bays can also be produced whose second plane and/or the third plane extend/extends orthogonally with respect to the first axis. In a switchgear bay which has been developed even further, seen in the direction of the third axis, all the first connecting conductor sections geometrically have a neutral first fiber, which first fibers extend in the direction of the longitudinal axis and are all arranged on a common plane. In a switchgear bay which has been developed even further for each phase conductor, each neutral first fiber and neutral third fiber corresponding thereto are arranged on a common straight line. An opposite arrangement of the neutral fibers of the connecting conductor sections such as this allows the switchgear bay to be made even more compact, without this having any particularly negative effect on the accessibility for assembly and maintenance purposes.

While, in the case of conventional switchgear bays, the overall physical height always increases with the number of phases, seen from the power connection of the circuit breaker (that is to say in the direction of the first axis), the compactness of the switchgear bay according to the present disclosure can be further improved if, seen in the direction of the third axis, the first busbar conductors are arranged such that at most one of the first busbar conductors is significantly further away, in the direction of the first axis, from the first power connection of the circuit breaker associated with the phase conductor than is the conductor node. This also applies analogously to switchgear bays whose third busbar conductors are arranged, seen in the direction of the third axis, such that at most one of the third busbar conductors is significantly further away, in the direction of the first axis, from the second power connection of the circuit breaker associated with the phase conductor than is the conductor node.

If the strength of the relevant components as well such as the connecting module, the circuit breaker housing and the busbar housing allows for this, the first busbar housing and the third busbar housing can be held predominantly by the connecting module, without any need for complex supporting means to absorb the mechanical forces for this purpose.

Depending on the embodiment of the switchgear bay, each third busbar conductor is arranged at a fourth distance from the third busbar housing, and either each first busbar conductor is arranged at the fourth distance from the first busbar housing, or each second busbar conductor is arranged at the fourth distance from the second busbar housing. In this case, the fourth distance, with respect to the length of the busbar conductors in the busbar section, is in most cases less than a fifth distance, at which the busbar conductors of the same busbar section are arranged away from one another. This promotes the formation of a fault arc leading to a ground short rather than to a three-phase arc in the event of a short.

Installation and removal of switchgear bays in the event of faults or maintenance can be further simplified/improved if first connecting areas of each busbar section are arranged on a fourth plane, and second connecting areas of each busbar section are arranged on a fifth plane. This applies in particular to switchgear bays whose fourth plane is arranged parallel to the fifth plane, and the fourth plane extends parallel to a sixth plane on which the first axis and the second axis are arranged. An embodiment such as this is particularly ideal if the switchgear bay has to be removed transversely with respect to the busbar direction, in the direction of the longitudinal axis and in the direction of the first axis (for example by means of a crane).

If each busbar conductor is in each case held in the first connecting area and in the second connecting area via a single-phase insulator, such that the first connecting areas and the second connecting areas form single-phase bushings from the corresponding busbar housing, particularly simple, but nevertheless proven and effective isolation means and—if required—gas compartmentalization concepts can be achieved for separation insulators, which at the same time allow advantageous connection of the busbar conductors.

If the first busbar conductors, the second busbar conductors and the third busbar conductors are predominantly or preferably completely cylindrical except in their connecting areas, then, for example, they can be manufactured from low-cost extruded profiles of conductor materials, without having to make use of complex free-form geometries.

The exemplary embodiments mentioned above can be used in combination with one another or as alternatives to one another, depending on the situation.

In summary, an advantage of the GIS switchgear bay according to the present disclosure is that it is designed to require considerably less space than known switchgear bays in height, in comparison to known switchgear assemblies, that is to say in the direction of the Earth's force of gravity, while at the same time requiring little space on the horizontal (orthogonally with respect to the direction of the Earth's gravity force).

This also applies in a corresponding manner to a substation which can be produced from a plurality of switchgear bays according to the present disclosure, for which reason only the following exemplary embodiments of substations will be described in the following text.

By way of example, in the case of a double busbar arrangement, a substation according to an exemplary embodiment of the present disclosure has at least three switchgear bays. At least two switchgear bays form a first type, which each have a first busbar section and/or a third busbar section. At least one switchgear bay forms a second type, which has a second busbar section and a third busbar section. In this case, the first type of switchgear bays may be a cable bay or a switch bay with insulating gas—air bushings, for example, and the second type of switchgear bays may be a coupling bay, for example.

Particularly compact substations can be achieved if the first axes of the first type of switchgear bays and of the second type of switchgear bays are arranged on a seventh plane, and if the second axes of the first type of switchgear bays and of the second type of switchgear bays are arranged on an eighth plane. In other words, even in the case of a double busbar arrangement, the switchgear bays are aligned such that there is no need for any switchgear bays to be offset to a major extent with respect to one another in the direction of the longitudinal axis, which would disadvantageously increase the width of a base area (installation area) of the substation.

Figure 1:
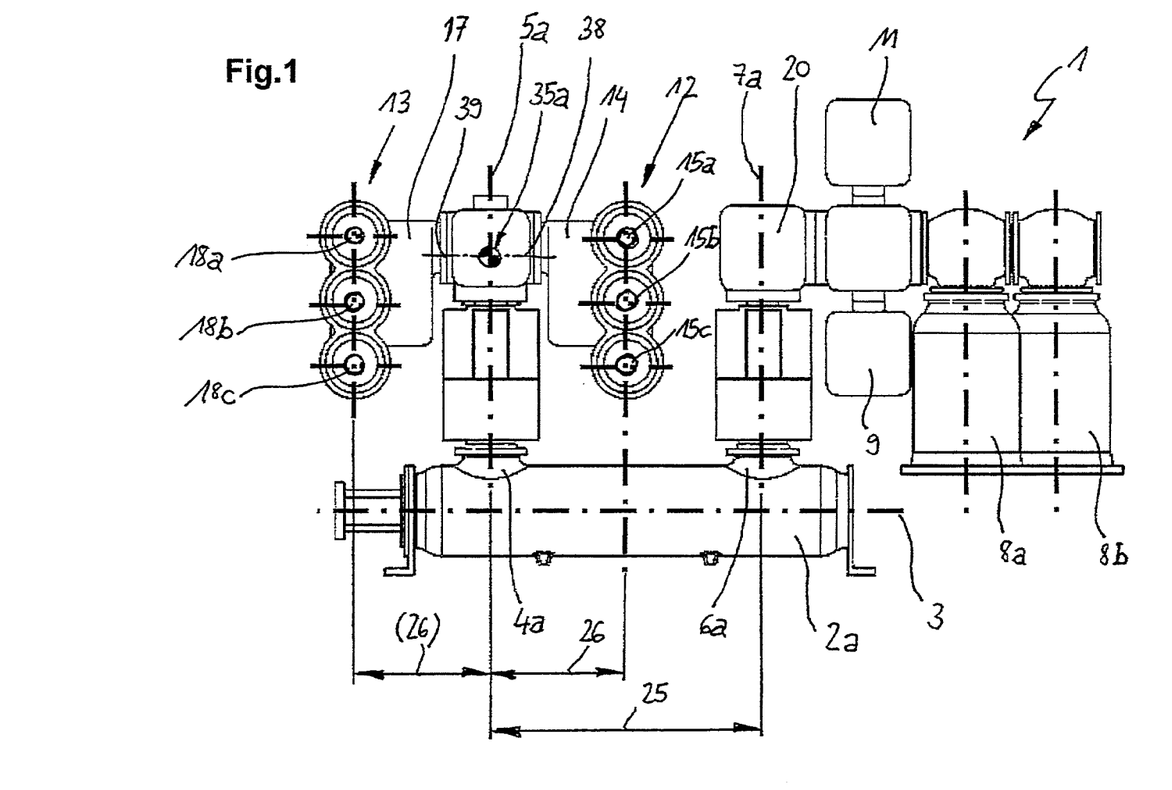
FIG. 1 shows a side view of a switch bay with cable connections according to an exemplary embodiment of the present disclosure.
Figure 4:
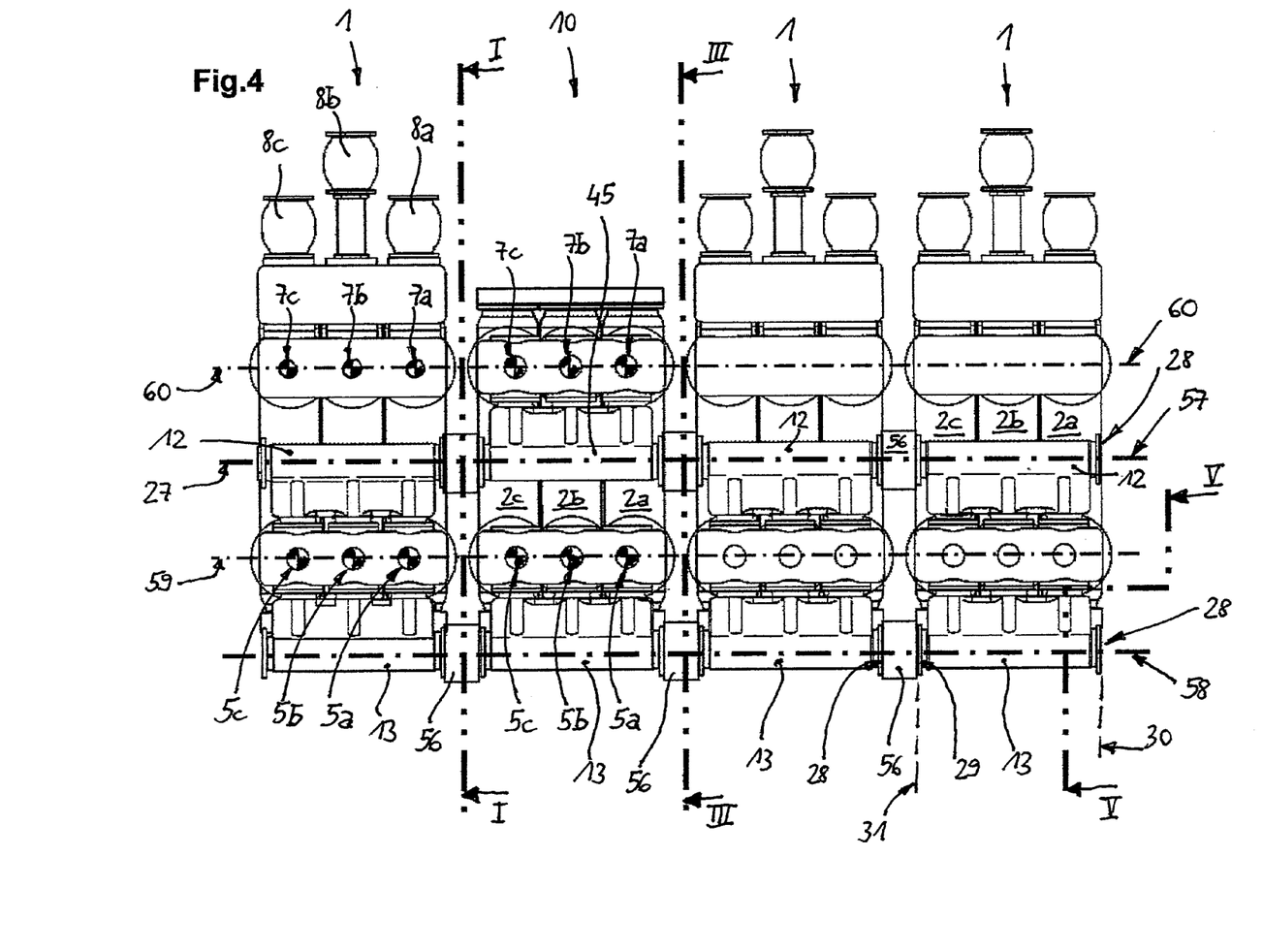
FIG. 4 shows a plan view of a substation with switch bay with cable connections as shown in FIG. 1 and with a coupling bay as shown in FIG. 3, according to an exemplary embodiment of the present disclosure.

The simplified side view of an exemplary embodiment of a switchgear bay 1 as shown in FIG. 1, in the form of a switch bay with cable connections or cable feeder bay, corresponds substantially to a view along the section plane I-I in FIG. 4.

As is evident in conjunction with FIG. 4, the switchgear bay 1 has one circuit breaker 2a, 2b, 2c for interrupting the respective phases, for each corresponding electrical phase, respectively. Since, in this embodiment, the circuit breakers are coincident when seen in the form of a side view, only the circuit breaker 2a can be seen in FIG. 1. Because of its cylindrical housing shape, the circuit breaker defines a longitudinal axis 3 which extends in the longitudinal direction. The circuit breaker 2a has a first power connection 4a which defines a first axis 5a which extends orthogonally with respect to the longitudinal direction 3. Furthermore, the circuit breaker 2a has a second power connection 6a which extends orthogonally with respect to the longitudinal direction in the same direction as the first power connection 4a and which second power connection 6a defines a second axis 7a. As is at least partially indicated in FIG. 2, this also applies analogously to the first power connections 4b, 4c; the first axes 5b, 5c; the second power connections 6b, 6c and the second axes 7b, 7c of the other two phases of the switchgear bay 1.

Figure 2:
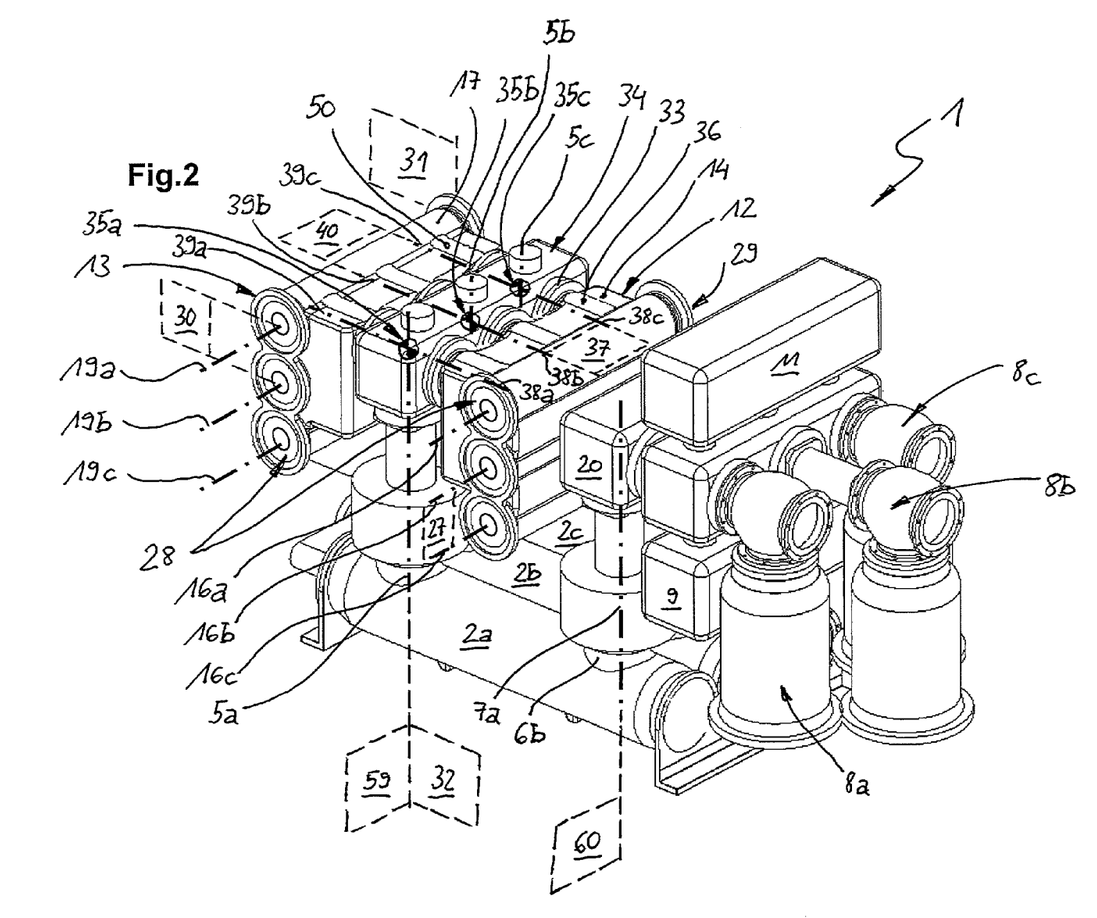
FIG. 2 shows a three-dimensional view of the cable outgoer bay from FIG. 1, according to an exemplary embodiment of the present disclosure.

Furthermore, the switchgear bay has a cable outgoer for each phase, of which the cable outgoer 8c is concealed in FIG. 1 by the cable outgoers 8a, 8b, but can be seen in FIG. 2. Each cable outgoer can also be used as a cable feeder, depending on the embodiment and the requirement, and/or can be configured as an open-air feeder or open-air outgoer. The cable outgoers are electrically connected to the respective second power connections via phase conductors, via/along auxiliary modules such as make-proof grounding switches 9, working grounding switches 20 and voltage measurement units 11. These auxiliary modules will not be described in any more detail at this point.

The switch bay with cable connections 1 is designed for a double busbar switching arrangement in a substation and therefore has a first busbar section 12 and a third busbar section 13. The first busbar section 12 has a first busbar housing 14 in which a first busbar conductor 15a, 15b, 15c is arranged for each phase. All the first busbar conductors 15a, 15b, 15c are arranged jointly, isolated from one another and with three-phase encapsulation, in a gas area in the first busbar housing 14 and, by virtue of their cylindrical shape and alignment, they each define a third axis 16a, 16b, 16c, as is evident in particular from FIG. 2. The third axes 16a, 16b, 16c extend orthogonally with respect to the longitudinal direction 3, and orthogonally with respect to the first axis 5a, 5b, 5c.

The insulating gas in the gas areas is sulfur hexafluoride or a gas mixture. Each busbar housing has a busbar opening for each busbar conductor, in order to allow the busbar conductor associated with it to be passed through separately. Separate accommodation in this case means that the busbar conductors are each arranged on a single-phase basis in the respective openings, in particular by being arranged to pass through a single-phase insulator. As is evident in conjunction with FIG. 5, single-phase insulators 21 are correspondingly used to accommodate only a single phase conductor, or busbar conductor in this case.

As is evident in particular from FIG. 2, the third busbar section 13, analogously to the first busbar section 12, has a third busbar housing 17, in which a third busbar conductor 18a, 18b, 18c for each phase is therefore arranged. All third busbar conductors 18a, 18b, 18c are jointly arranged, isolated from one another and with three-phase encapsulation, in a gas area in the third busbar housing 17, and, by virtue of their cylindrical shape and alignment, each define a fifth axis 19a, 19b, 19c, as is particularly evident from FIG. 2. The fifth axes 19a, 19b, 19c extend orthogonally with respect to the longitudinal direction 3, and orthogonally with respect to the first axis 5a, 5b, 5c.

The first axis is arranged at a first distance 25 from the second axis. The third axes 16a, 16b, 16c are arranged at a second distance 26 from the first axis 5a, 5b, 5c in the longitudinal direction 3. The fifth axes 19a, 19b, 19c are in this case arranged such that they have the same orientation co-ordinates as the third axes 16a, 16b, 16c which have been rotated through 180° about the first axes 5a, 5b, 5c.

All the first axes 5a, 5b, 5c are arranged on a first plane 27, such that they are arranged at a uniform distance from one another along a straight line, seen in the direction of the third axis 16. This also applies in the same sense to all the third axes 18a, 18b, 18c.

On the end face, the busbar sections 12, 13 each have a first connecting area 28 and a second connecting area 29. The first connecting areas 28 are arranged on a fourth plane 30, while the second connecting areas 29 of each busbar section are arranged on a fifth plane 31. This fourth plane 30 is arranged parallel to the fifth plane 31 and, furthermore, extends parallel to a sixth plane 32, on which, for example, the first axis 5a and the second axis 7a of a phase are arranged. Each busbar conductor is held via a single-phase insulator in each case both in the first connecting area 28 and in the second connecting area 29, such that the first connecting areas 28 and the second connecting areas 29 form single-phase bushings from the corresponding busbar housing.

It is particularly clearly evident from FIG. 2 that both the first busbar section 12 and the third busbar section 13 each have a separate connecting flange for each conductor phase (FIG. 2 shows the conductor phase with the first axis 5c being representative of all the other phases with connecting flange 33). Expressed in other words, each busbar housing has one busbar opening for each phase, in order to allow the busbar conductor associated with it to be passed through separately. In this case, once again, separate accommodation means that the busbar conductors are each arranged in a single-phase form in the respective openings, and in particular are arranged to pass through a single-phase insulator. Single-phase insulators are correspondingly used for accommodation of only a single phase conductor, or in this case busbar conductor.

In this exemplary embodiment of the switchgear bay 1, the first busbar housing 14 and the third busbar housing 17 are held on a connecting module 34 arranged between them, via the connecting flanges 33. The connecting module 34 and the busbar housings 14, 17 as well as the circuit breakers are designed to have a strength such that the busbar housings 14, 17 are held mechanically only or predominantly by the connecting module 34.

The connecting module 34 contains a conductor node 35a, 35b, 35c for each conductor phase, which conductor node 35a, 35b, 35c forms an electrical primary power connection for the busbar conductors 15a, 15b, 15c, 18a, 18b, 18c to the respective first power connections 4a, 4b, 4c of the circuit breakers 2a, 2b, 2c associated with them. Each of these conductor nodes 35a, 35b, 35c is connected via a first connecting conductor section which leads to the first busbar conductors 15a, 15b, 15c. Seen in the direction of the third axis 16, all the first connecting conductor sections geometrically have a neutral first fiber, which first fibers extend in the direction of the longitudinal axis 3 and are all arranged on a second plane 37. In order to improve the clarity, FIG. 2 shows only the first connecting conductor section 36 of one phase conductor from the first axis 5c as being representative of the remaining phase conductors, and the first fibers 38a, 38b, 38c of all the first connecting conductor sections in the area of the connecting flanges 33. A corresponding situation applies to the third busbar section 13 in which, seen in the direction of the third axis 16, all the third connecting conductor sections 50 geometrically have a neutral third fiber 39a, 39b, 39c, which third fibers extend in the direction of the longitudinal axis 3 in the third connecting conductor section and are all arranged on a third plane 40. In this context, a neutral fiber does not mean an electrically neutral phase or fiber but the geometric center line or neutral fiber, as known from cylindrical profiled shapes. If a phase conductor has a circular cylindrical cross section, the neutral fiber therefore corresponds to the axis of rotation.

Furthermore, seen in the direction of the third axis 16, all the conductor nodes are arranged at the same height in the direction of the first axis 5 (starting as seen from the first power connections), such that the second plane 37 and the third plane 40 extend orthogonally with respect to the first axis 5, with the second plane 37 and the third plane 40 being identical, that is to say being coincident with one another. In consequence, for each phase conductor, each neutral first fiber 38a, 38b, 38c and neutral third fiber 39a, 39b, 39c corresponding thereto are arranged on a common straight line. As is evident in particular from FIG. 1, seen in the direction of the third axis 16, the first busbar conductors 15a, 15b, 15c and the third busbar conductors 18a, 18b, 18c are arranged such that only the first busbar conductor 15a and the third busbar conductor 18a are significantly further away, in the direction of the first axis, from the first power connection 4a of the circuit breaker 2a associated with the phase conductor than is the associated conductor node 35a.

The connecting module 34 furthermore has a working grounding switch (not shown) for each conductor phase, if required. As in the busbar sections 12, 13, all the conductor phases in the connecting module 34 are also arranged jointly encapsulated in a common gas area.

With respect to the exemplary embodiment of a further switchgear bay as will be explained in the following text, it should also be noted that the first plane 27, which runs orthogonally with respect to the sixth plane 32, with the third axes 16a, 16b, 16c is arranged, seen in the direction of the longitudinal axis 3, centrally between the first axes 5a, 5b, 5c and the second axes 7a, 7b, 7c. In consequence, the second distance 26 is half the first distance 25.

Figure 3:
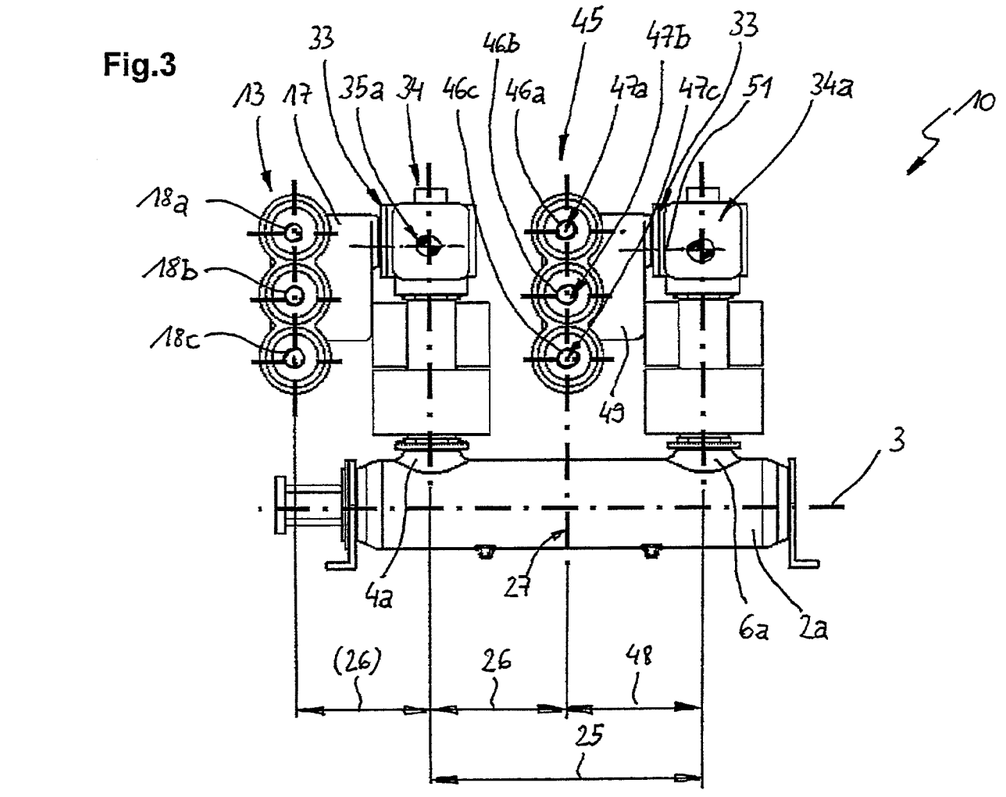
FIG. 3 shows a side view of a coupling bay according to an exemplary embodiment of the present disclosure.

The simplified side view of an exemplary embodiment of a switchgear bay 10 as shown in FIG. 3 is in the form of a coupling bay, shown in a view which corresponds substantially to a view along the section plane III-III in FIG. 4. Identical elements or elements having the same effect as those for the cable bay 1 will not be described in more detail, and the reference symbols are correspondingly retained. Therefore, the following text will mainly describe the differences from the embodiment of the switchgear bay 1.

Since, in this exemplary embodiment of the switchgear bay 10, there is no first busbar section, the connecting flanges at this point are either closed by covers, or the connecting module 34 is appropriately adapted. Instead of the first busbar section, the coupling bay 10 has a second busbar section 45 which is connected, for primary power purposes, to the second power connection 6a, 6b, 6c. Since, in this case, this second busbar section 45 is physically identical to the third busbar section 13, the third busbar conductors 18a, 18b, 18c in the case of the second busbar section 45 correspond in a corresponding manner to the second busbar conductors 46a, 46b, 46c. These second busbar conductors 46a, 46b, 46c correspondingly defined fourth axes 47a, 47b, 47c, which are arranged at a third distance 48 from the second axes 7a, 7b, 7c. Compared with the first mounting state of the switchgear bay 1 relating to the first busbar section, the third distance 48 in the case of the second mounting state of the switchgear bay 10 is of the same size, with the first distance 25 remaining the same, as the second distance 26. Seen in the direction of the fourth axes, the fourth axes 47a, 47b, 47c are arranged on the first plane 27 such that the fourth axes are arranged with respect to position and orientation on a common straight line with the third axes in the second mounting state, in the same position in the three-dimensional space. As in the case of the first busbar section, all three of the second busbar conductors 46a, 46b, 46c are arranged in a common gas area, which is bounded by a second busbar housing 49.

Analogously to the first busbar section, the second busbar housing 49 of the second busbar section 45 is likewise attached to a connecting module 34a. In the embodiment 10, the connecting module 34a and the busbar section 45 are physically identical to those in the exemplary embodiment of the switchgear bay 1, for which reason reference is made to the description for the first busbar section for further details relating to the second busbar section 45.

In both embodiments 1, 10, the first busbar conductors 15, the second busbar conductors 46 and the third busbar conductors 18 are essentially cylindrical. At least in the area of the connecting flanges, this also applies to the second connecting conductor sections 51.

Figure 5:
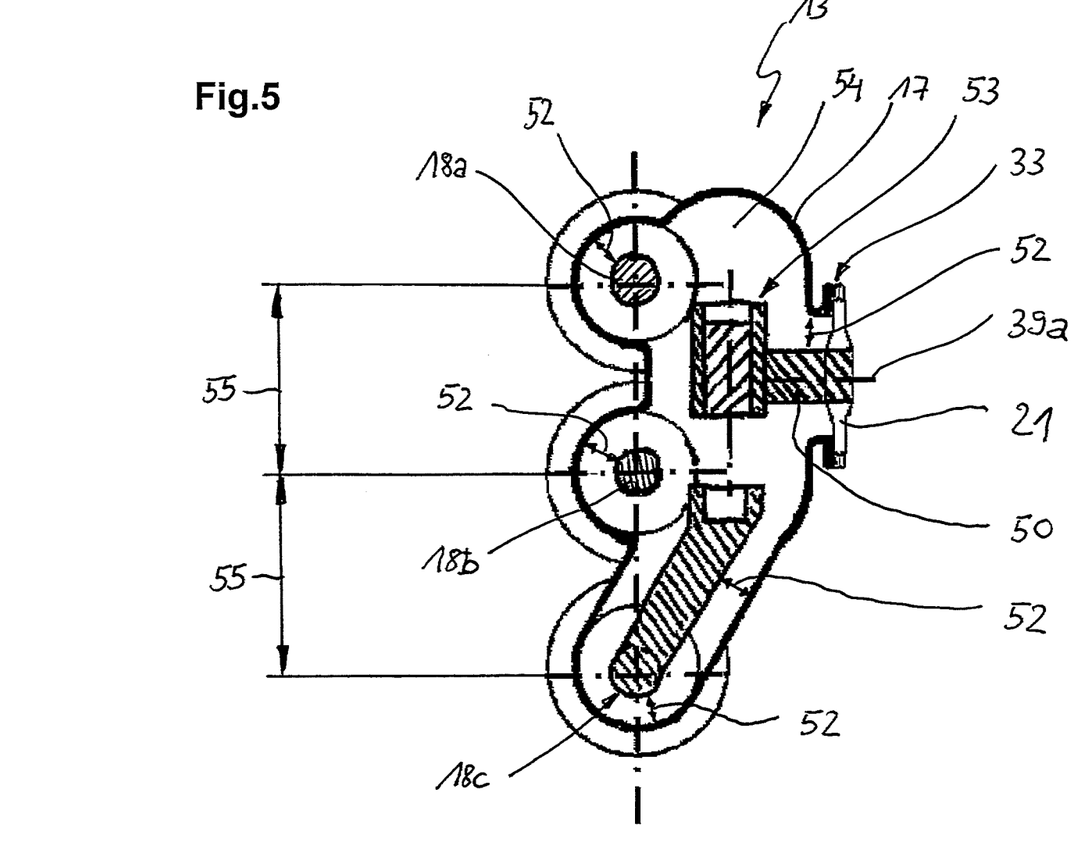
FIG. 5 shows a simplified section illustration through a busbar section along the section plane V-V in FIG. 4, according to an exemplary embodiment of the present disclosure.

It can also be stated that, depending on the embodiment of the switchgear bay 1, 10, each third busbar conductor 18a, 18b, 18c is arranged at a fourth distance 52 through the gas area to the third busbar housing 17. Analogously to this, either each first busbar conductor 15a, 15b, 15c or each second busbar conductor 46a, 46b, 46c is arranged at the fourth distance 52 from the first busbar housing 14 or the second busbar housing 49, respectively. As is evident in conjunction with FIG. 5, this fourth distance 52 is less than a fifth distance 55, at which the busbar conductors of the same busbar section are arranged at a distance from one another, for example the busbar conductors 15a, 15b, 15c of the first busbar section 12. In the case of the embodiment of the busbar section 13 as shown in FIG. 5, a further switch in the form of a disconnector 53 is arranged in the common gas area 54 for each phase conductor, for example between the third connecting conductor section 50 and the third busbar connector 18c.

The plan view illustrated in FIG. 4 of a substation according to an exemplary embodiment of the present disclosure with a double busbar arrangement with three switch bays with cable connections which form a first type as shown in FIG. 1, and a coupling bay of the second type of switchgear bays as shown in FIG. 3, will be described in the following text, although in this case only four representative switchgear bays are illustrated, in the form of a detail and in a simplified form. As is evident from FIG. 4, a connecting module 56 is in each case arranged between two third busbar sections 13 and between first and second busbar sections 12, 45 for each phase conductor, thus forming a continuous first busbar 57 and a continuous second busbar 58. The connecting modules 56 provide a likewise gas-insulated connection between two adjacent busbar conductors of the same phase, and provide access to the first connecting areas 28 and the second connecting areas 29.

Since the circuit breakers 2a, 2b, 2c, both in the case of switchgear bays of the first type 1 and in the case of the second type 10, are very largely identical, the switchgear bays 1, 10 can be arranged relative to one another such that the first axes 5a, 5b, 5c of the first type of switchgear bays 1 and of the second type of switchgear bays 10 are arranged jointly on a seventh plane 59. Correspondingly, the second axes 7a, 7b, 7c of the first type of switchgear bays 1 and of the second type of switchgear bays 10 are arranged on an eighth plane 60.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS 1, 10 Switchgear bay
2a,2b,2c Circuit breaker
3 Longitudinal direction, longitudinal axis
4a,4b,4c First power connection
5a,5b,5c First axis
6a,6b,6c Second power connection
7a,7b,7c Second axis
8a,8b,8c Cable outlet
9 Make-proof grounding switch
11 Voltage measurement unit
12 First busbar section
13 Second busbar section
14 First busbar housing
15a,15b,15c First busbar conductor
16a,16b,16c Third axis
17 Third busbar housing
18a,18b,18c Third busbar conductor
19a,19b,19c Fifth axis
20 Working grounding switch
25 First distance
26 Second distance
27 First plane
28 First connecting area
29 Second connecting area
30 Fourth plane
31 Fifth plane
32 Sixth plane
33 Connecting flange
34, 34a Connecting module
35a,35b,35c Conductor node
36 First connecting conductor section
37 Second plane
38a,38b,38c Neutral first fiber
39a,39b,39c Neutral second fiber
40 Third plane
45 Second busbar section
46a,46b,46c Second busbar conductor
47a,47b,47c Fourth axis
48 Third distance
49 Second busbar housing
50 Third connecting conductor section
51 Second connecting conductor section
52 Fourth distance
53 Switch/disconnector
54 Gas area
55 Fifth distance
56 Connecting module
57 First busbar
58 Second busbar
59 Seventh plane
60 Eighth plane

What is claimed is:

1. A gas-insulated switchgear bay comprising:
at least three conductor phases for different electrical potentials; and
at least three circuit breakers each respectively provided for a corresponding one of the at least three conductor phases, wherein:
each conductor phase is configured to be interrupted by its corresponding circuit breaker;
shapes of the circuit breakers define a longitudinal direction;
at least one of the circuit breakers includes a first power connection which defines a first axis which extends orthogonally with respect to the longitudinal direction;
the at least one of the circuit breakers includes a second power connection which extends orthogonally with respect to the longitudinal direction in the same direction as the first power connection, the second power connection defining a second axis;
the at least one of the circuit breakers is configured to be electrically conductively connected via the first power connection to a respective gas-insulated third busbar conductor of a third busbar section, such that the third busbar conductor defines a third axis which extends orthogonally with respect to the longitudinal direction and orthogonally with respect to the first axis;
the third busbar section includes a third busbar housing in which all of the third busbar conductors are arranged in a common gas area;
a first distance between the first axis and the second axis is of a size such that the switchgear bay may be assembled either
a) in a first mounting state comprising a first busbar section and the third busbar section connected to the first power connection; or
b) in a second mounting state comprising the third busbar section connected to the first power connection; and a second busbar section connected to the second power connection.

2. The switchgear bay as claimed in claim 1, wherein each first power connection of the circuit breakers is configured to be electrically conductively connected to a corresponding gas-insulated first busbar conductor of a first busbar section, such that the third axes lie on a first plane, and the first plane extends orthogonally with respect to the longitudinal axis and parallel to the first axis.

3. The switchgear bay as claimed in claim 1, wherein the fifth axis has the same orientation co-ordinates as a third axis which has been rotated through 180° about the first axis.

4. The switchgear bay as claimed in claim 1, comprising: a first busbar section which is electrically connected to the first power connection.

5. The switchgear bay as claimed in claim 4, wherein the third busbar section and the first busbar section are commonly attached to the connecting module, which forms a conductor node for each conductor phase.

6. The switchgear bay as claimed in claim 5, wherein: the connecting module includes a working grounding switch for each conductor phase; and all the conductor phases in the connecting module are arranged jointly encapsulated in a common gas area.

7. The switchgear bay as claimed in claim 6, wherein the connecting module is connected to the first power connection of the circuit breaker which is associated with the phase conductor.

8. The switchgear bay as claimed in claim 5, wherein, from a perspective in the direction of the third axis, all the conductor nodes are arranged at the same height in the direction of the first axis.

9. The switchgear bay as claimed in claim 5, wherein:
in the connecting module, each conductor node is connected via a first connecting conductor section which leads to the first busbar conductors; and
from a perspective in the direction of the third axis, all the first connecting conductor sections geometrically have a neutral first fiber, respectively, the first fibers all being arranged on a second plane extending in the direction of the longitudinal axis.

10. The switchgear bay as claimed in claim 5, wherein:
in the connecting module, each conductor node is connected via a third connecting conductor section which leads to the third busbar conductors; and
from a perspective in the direction of the third axis, all the third connecting conductor sections geometrically have a neutral third fiber, which third fibers extend in the direction of the longitudinal axis and are all arranged on a third plane.

11. The switchgear bay as claimed in claim 9, wherein at least one of the second plane and the third plane extends orthogonally with respect to the first axis.

12. The switchgear bay as claimed in claim 11, wherein the second plane and the third plane are arranged on a common plane.

13. The switchgear bay as claimed in claim 12, wherein, for each phase conductor, each neutral first fiber and neutral third fiber corresponding thereto are arranged on a common straight line.

14. The switchgear bay as claimed in claim 5, wherein, from a perspective in the direction of the third axis, the first busbar conductors are arranged such that at most one of the first busbar conductors is significantly further away, in the direction of the first axis, from the first power connection of the circuit breaker associated with the phase conductor than is the conductor node.

15. The switchgear bay as claimed in claim 5, wherein the first busbar housing and the third busbar housing are predominantly held by the connecting module.

16. The switchgear bay as claimed in claim 1, wherein: each third busbar conductor is arranged at a fourth distance from the third busbar housing, and one of (i) each first busbar conductor is arranged at the fourth distance from the first busbar housing, and (ii) each second busbar conductor is arranged at the fourth distance from the second busbar housing; and the fourth distance is shorter than a fifth distance at which the busbar conductors of the same busbar section are arranged away from one another.

17. The switchgear bay as claimed in claim 1, wherein first connecting areas of each busbar section for each switchgear bay are arranged on a fourth plane, and second connecting areas of each busbar section are arranged on a fifth plane.

18. The switchgear bay as claimed in claim 17, wherein the fourth plane is arranged parallel to the fifth plane, and the fourth plane extends parallel to a sixth plane on which the first axis and the second axis are arranged.

19. The switchgear bay as claimed in claim 1, wherein each busbar conductor is respectively held in the first connecting area and in the second connecting area via a single-phase insulator, such that the first connecting areas and the second connecting areas form single-phase bushings from the corresponding busbar housing.

20. The switchgear bay as claimed in claim 1, wherein the first busbar conductors, the second busbar conductors and the third busbar conductors are cylindrical.

21. A substation having at least three switchgear bays as claimed in claim 1, wherein: at least two switchgear bays are of a first type assembled in the first mounting state, which each have at least one of a first busbar section and a third busbar section and at least one switchgear bay is a switchgear bay of a second type assembled in the second mounting state having a second busbar section and a third busbar section.

22. The substation as claimed in claim 21, wherein: the first axes of the first type of switchgear bays and of the second type of switchgear bays are arranged on a seventh plane; and the second axes of the first type of switchgear bays arid of the second type of switchgear bays are arranged on an eighth plane.

23. The substation as claimed in claim 21, wherein: the switchgear bays of the first type and of the second type are connected to one another by means of a double busbar arrangement; the first type of switchgear bays is one of a cable bay and an open-air outgoer; and the second type of switchgear bays is a coupling bay.

24. The substation as claimed in claim 22, wherein: the switchgear bays of the first type and of the second type are connected to one another by means of a double busbar arrangement; the first type of switchgear bays is one of a cable bay and an open-air outgoer: and the second type of switchgear bays is a coupling bay.

25. The switchgear bay as claimed in claim 1, wherein each first power connection of the circuit breakers is configured to be electrically conductively connected to a corresponding gas-insulated first busbar conductor of a first busbar section, such that the third axes lie on a first plane, and the first plane extends orthogonally with respect to the longitudinal axis and parallel to the first axis.

26. The switchgear bay as claimed in claim 25, wherein: the switchgear bay has a third busbar section which is electrically connected to the first power connection and whose gas-insulated third busbar conductor defines a fifth axis which extends orthogonally with respect to the longitudinal direction and orthogonally with respect to the first axis; and the third busbar section has a third busbar housing in which all of the third busbar conductors are arranged in a common gas area.

27. The switchgear bay as claimed in claim 26, wherein the fifth axis has the same orientation co-ordinates as a third axis which has been rotated through 180° about the first axis.

28. The switchgear bay as claimed in claim 27, comprising: a first busbar section which is electrically connected to the first power connection.

29. The switchgear bay as claimed in claim 28, wherein the third busbar section and the first busbar section are commonly attached to the connecting module, which forms a conductor node for each conductor phase.

30. The switchgear bay as claimed in claim 29, wherein: the connecting module includes a working grounding switch for each conductor phase: and all the conductor phases in the connecting module are arranged jointly encapsulated in a common gas area.

31. The switchgear bay as claimed in claim 30, wherein the connecting module is connected to the first power connection of the circuit breaker which is associated with the phase conductor.

32. The switchgear bay as claimed in claim 31, wherein, from a perspective in the direction of the third axis, all the conductor nodes are arranged at the same height in the direction of the first axis.

33. The switchgear bay as claimed in claim 32, wherein:
in the connecting module, each conductor node is connected via a first connecting conductor section which leads to the first busbar conductors; and
from a perspective in the direction of the third axis, all the first connecting conductor sections geometrically have a neutral first fiber, respectively, the first fibers all being arranged on a second plane extending in the direction of the longitudinal axis.

34. The switchgear bay as claimed in claim 32, wherein: in the connecting module, each conductor node is connected via a third connecting conductor section which leads to the third busbar conductors; and from a perspective in the direction of the third axis, all the third connecting conductor sections geometrically have a neutral third fiber, which third fibers extend in the direction of the longitudinal axis and are all arranged on a third plane.

35. The switchgear bay as claimed in claim 34, wherein at least one of the second plane and the third plane extends orthogonally with respect to the first axis.

36. The switchgear bay as claimed in claim 35, wherein the second plane and the third plane are arranged on a common plane.

37. The switchgear bay as claimed in claim 36, wherein, for each phase conductor, each neutral first fiber and neutral third fiber corresponding thereto are arranged on a common straight line.

38. The switchgear bay as claimed in claim 37, wherein, from a perspective in the direction of the third axis, the first busbar conductors are arranged such that at most one of the first busbar conductors is significantly further away, in the direction of the first axis, from the first power connection of the circuit breaker associated with the phase conductor than is the conductor node.

39. The switchgear bay as claimed in claim 38, wherein the first busbar housing and the third busbar housing are predominantly held by the connecting module.

40. The switchgear bay as claimed in claim 1 in its first mounting state, wherein the first busbar section is electrically connected to the first power connection, by a connecting module attached to the first busbar housing.

41. The switchgear bay as claimed in claim 40, wherein the circuit breakers are electrically conductively connected to a respective gas-insulated first busbar conductor of the first busbar section such that the first busbar conductor define a respective third axis extending orthogonally with respect to the longitudinal direction and orthogonally with respect to the first axis and orthogonally to the second axis, and wherein the third axis is arranged at a second distance from the first axis in the longitudinal direction.

42. The switchgear bay as claimed in claim 41, wherein the length of the second distance equals to half of the length of the first distance.

43. The switchgear bay as claimed in claim 1 in its second mounting state, wherein the second busbar section is electrically connected to the second power connection by a connecting module attached to the second busbar housing.

44. The switchgear bay as claimed in claim 43, wherein the second busbar section has gas-insulated second busbar conductors that are arranged in a common gas area in the second busbar housing; and wherein the circuit breakers are electrically conductively connected to a respective gas-insulated second busbar conductor of the second busbar section such that the second busbar conductor define a respective fourth axis extending orthogonally with respect to the longitudinal direction and orthogonally with respect to the first axis and orthogonally to the second axis; and wherein the fourth axis is arranged at a third distance from the second axis in the longitudinal direction.

45. The switchgear bay as claimed in claim 44, wherein the length of the third distance equals to half of the length of the first distance.

* * * * *